United States Patent [19]
Wolcott

[11] Patent Number: 5,363,912
[45] Date of Patent: Nov. 15, 1994

[54] ELECTROMAGNETIC COUPLING

[75] Inventor: John H. Wolcott, Racine, Wis.

[73] Assignee: Eaton Corporation, Cleveland, Ohio

[21] Appl. No.: 63,516

[22] Filed: May 18, 1993

[51] Int. Cl.$^5$ .............................................. E21B 33/00
[52] U.S. Cl. .......................................... 166/72; 74/47;
310/105
[58] Field of Search .............. 166/72; 74/47; 310/105,
310/103, 106

[56]           References Cited
        U.S. PATENT DOCUMENTS

| 3,742,270 | 6/1973  | Jaeschke      | 310/105 |
| 4,469,968 | 9/1984  | Jaeschke      | 310/105 |
| 4,780,637 | 10/1988 | Wolcott       | 310/263 |
| 4,827,171 | 5/1989  | Bertram et al.| 310/105 |
| 5,136,878 | 8/1992  | Wolcott       | 73/117  |
| 5,149,998 | 9/1992  | Wolcott       | 310/105 |

*Primary Examiner*—William P. Neuder
*Attorney, Agent, or Firm*—Tarolli, Sundheim & Covell

[57]                ABSTRACT

An improved electromagnetic coupling apparatus is advantageously utilized in conjunction with an oil well pump assembly. The electromagnetic coupling apparatus includes rotatable inner and outer shafts. A stationary annular coil assembly is supported on the outer shaft by bearings which allow the outer shaft to rotate relative to the coil. A pole piece drum extends around the outer shaft and is effective to concentrate magnetic flux conducted from the stationary coil. A rotatable eddy current drum extends around the pole piece drum. The pole piece and eddy current drums are fixedly connected with the inner and outer shafts. The inner and outer shafts extend in the same axial direction from the pole piece and eddy current drums.

30 Claims, 2 Drawing Sheets

ELECTROMAGNETIC COUPLING

BACKGROUND OF THE INVENTION

The present invention relates to an electromagnetic coupling of the type having a pole piece drum and an eddy current drum which cooperate with a coil. The coupling may advantageously be utilized to drive an oil well pump assembly.

The environment around oil well pump assemblies is typically a caustic environment in which hydrogen sulfide combines with water to form acid, which through electrolytic action, will eventually destroy brushes and slip rings in electrical apparatus. The slip rings may actually become so pitted by the electrolytic action that even if the brushes are replaced, the slip rings will continue to act as an abrasive and cause excessive brush wear. If possible, brushes and/or slip rings should be eliminated from apparatus used in the environment around oil well pump assemblies in order to increase the reliability of the apparatus.

In order to provide adequate control of the operation of an oil well pump assembly, it is contemplated that it may be desirable to retrofit an electromagnetic coupling to a motor which was originally provided to drive the oil well pump assembly. The electromagnetic coupling should be readily mounted in association with the existing oil well pump assembly drive motor and be capable of operating for long periods of time, in a relatively caustic environment, with little or no maintenance. Of course, an electromagnetic coupling having these attributes will be useful in conjunction with many different types of apparatus other than oil well pump assemblies.

SUMMARY OF THE INVENTION

The present invention relates to an electromagnetic coupling having a rotatable outer shaft which is disposed in a coaxial relationship with and circumscribes a rotatable inner shaft. A stationary coil assembly is disposed in a coaxial relationship with the inner and outer shafts. A rotatable pole piece drum is disposed in a coaxial relationship with and circumscribes the stationary coil assembly. A rotatable eddy current drum is disposed in a coaxial relationship with and circumscribes both the pole piece drum and the stationary coil assembly. The pole piece and eddy current drums are connected with the inner and outer shafts. The inner and outer shafts extend in the same axial direction from the pole piece and eddy current drums.

In one specific embodiment of the invention, the inner shaft is connected with the eddy current drum and is driven by the output shaft of a motor. The pole piece drum is connected with the outer shaft and drives an apparatus, such as an oil well pump assembly, connected with the electromagnetic coupling. However, it is contemplated that the eddy current drum could be connected with the inner shaft and the pole piece drum could be connected with the outer shaft. The eddy current drum and pole piece drum may be oriented so as to open either toward or away from end portions of the inner and outer shafts. The inner shaft or the outer shaft may be the driven shaft.

BRIEF DESCRIPTION OF THE DRAWINGS

The foregoing and other features of the present invention will become more apparent upon a consideration of the following description taken in connection with the accompanying drawings, wherein.

DESCRIPTION OF SPECIFIC PREFERRED EMBODIMENTS OF THE INVENTION

Figure 1:
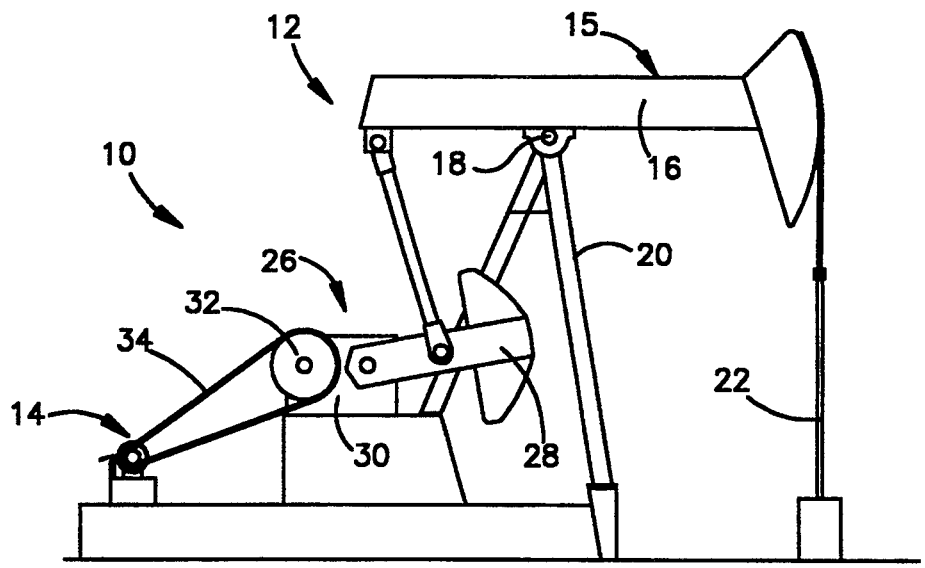
FIG. 1 is a highly schematicized illustration depicting the manner in which an improved drive assembly is utilized to drive a known oil well pump assembly.

An oil well pumping apparatus 10 is illustrated in FIG. 1. The oil well pumping apparatus 10 includes a known oil well pump assembly 12. An improved drive assembly 14 is utilized to drive the oil well pump assembly 12. Although the drive assembly 14 is believed to be very advantageous for use in association with the oil well pump assembly 12, the drive assembly could be used in association with a different apparatus.

The oil well pump assembly 12 includes a beam assembly 15 having a beam 16 which is pivoted about a connection 18 with a base 20 to reciprocate a pump rod 22. Reciprocation of the pump rod 22 pumps oil in a known manner. A crank assembly 26 is connected with the beam assembly 15. The crank assembly 26 includes a crank arm 28 which is connected with a gear reduction unit 30 having an input sheave 32.

The drive assembly 14 is connected with the input sheave 32 by a plurality of flexible V-belts 34. Of course, force transmitting devices other than V-belts could be utilized to transmit force from the drive assembly 14 to the gear reduction unit 30.

The drive assembly 14 (FIG. 2) includes an electric motor 40 having a cylindrical output shaft 42. During operation of the motor 40, the output shaft 42 is rotated about its central axis 44. An improved electromagnetic coupling 46 is provided to transmit force from the electric motor 40 to the drive belts 34.

The improved electromagnetic coupling 46 includes a generally cylindrical tubular inner shaft 48. The tubular inner shaft 48 has a relatively large diameter cylindrical end portion 50 which telescopically receives the motor output shaft 42. The motor output shaft 42 and the inner end portion 50 of the inner shaft 48 are fixedly interconnected, by a suitable key or other device. Therefore, the inner shaft 48 rotates with and is driven by the motor output shaft 42.

It is contemplated that it may be desirable to disconnect the tubular inner shaft 48 from the motor output shaft 42. When this is done, an externally threaded member (not shown), similar to a long bolt, is inserted through an open outer end of the inner shaft 48. The externally threaded member engages an internal thread convolution 54 on a nut 56 fixedly secured to the inside of the inner shaft 48. Upon rotation of the externally threaded member, the externally threaded member presses against the end of the motor output shaft 42 to pull the inner shaft 48 off of the motor output shaft 42.

A generally cylindrical tubular outer shaft 60 (FIG. 2) is disposed in a coaxial relationship with and circumscribes both the inner shaft 48 and motor output shaft 42. The outer shaft 60 is rotatably supported on the inner shaft 48 by a pair of annular bearing assemblies 64 and 66. The bearing assemblies 64 and 66 include rollers 68. Of course, ball bearings could be used in place of the rollers 68.

The rollers 68 are disposed between annular inner races 70 which are fixedly connected to and coaxial with the inner shaft 48 and annular outer races 72 which are fixedly connected to and coaxial with a relatively large diameter cylindrical portion 74 of the outer shaft 60. The bearing assemblies 64 and 66 allow the inner shaft 48 to rotate relative to the outer shaft 60. Annular grooves 76 are formed in the relatively large diameter cylindrical end portion 74 of the outer shaft 60 to form a sheave 78 which is engaged by the drive belts 34 (FIG. 1).

In accordance with a feature of the invention, a stationary annular coil assembly 82 (FIG. 2) is provided in the electromagnetic coupling 46. The rotatable inner and outer shafts 48 and 60 are coaxial with and extend axially through the stationary coil assembly 82. The stationary coil assembly 82 is supported on a relatively small diameter, axially outer, cylindrical end portion 84 of the outer shaft 60 by a pair of annular bearing assemblies 86 and 88. The bearing assemblies 86 and 88 allow the outer shaft 60 to rotate relative to the stationary coil assembly 82 while supporting the coil assembly on the outer shaft.

The stationary annular coil assembly 82 includes an annular field iron member 92 which encloses an annular coil winding 94. The annular coil winding 94 is energized by electrical energy transmitted through a conductor 96. The stationary annular field iron member 92 is coaxial with the rotatable inner and outer shafts 48 and 60. The inner and outer shafts 48 and 60 extend axially through the field iron member 92 and coil winding 94.

An anchor or tether 98 holds the coil assembly 82 against rotation. The anchor 98 extends radially outwardly from an end of the coil assembly 82 and connects the coil assembly with a stationary base or support, indicated schematically at 100 in FIG. 3. The conductor 96 extends along the stationary anchor 98. The stationary anchor 98 is fixedly secured to the field iron member 92 and holds the coil assembly 82 stationary.

A generally cylindrical pole piece drum 104 (FIG. 2) is fixedly connected to the axially outer end portion 84 of the outer shaft 60 for rotation therewith. The pole piece drum 104 is formed of iron or other magnetically conductive material. The pole piece drum 104 circumscribes and is coaxial with the stationary annular coil assembly 82 and the inner and outer shafts 48 and 60. The pole piece drum 104 includes an annular end wall 108 which extends radially outwardly from the outer end portion 84 of the outer shaft 60 along the side of the coil assembly 82 opposite from the motor 40.

Figure 3:
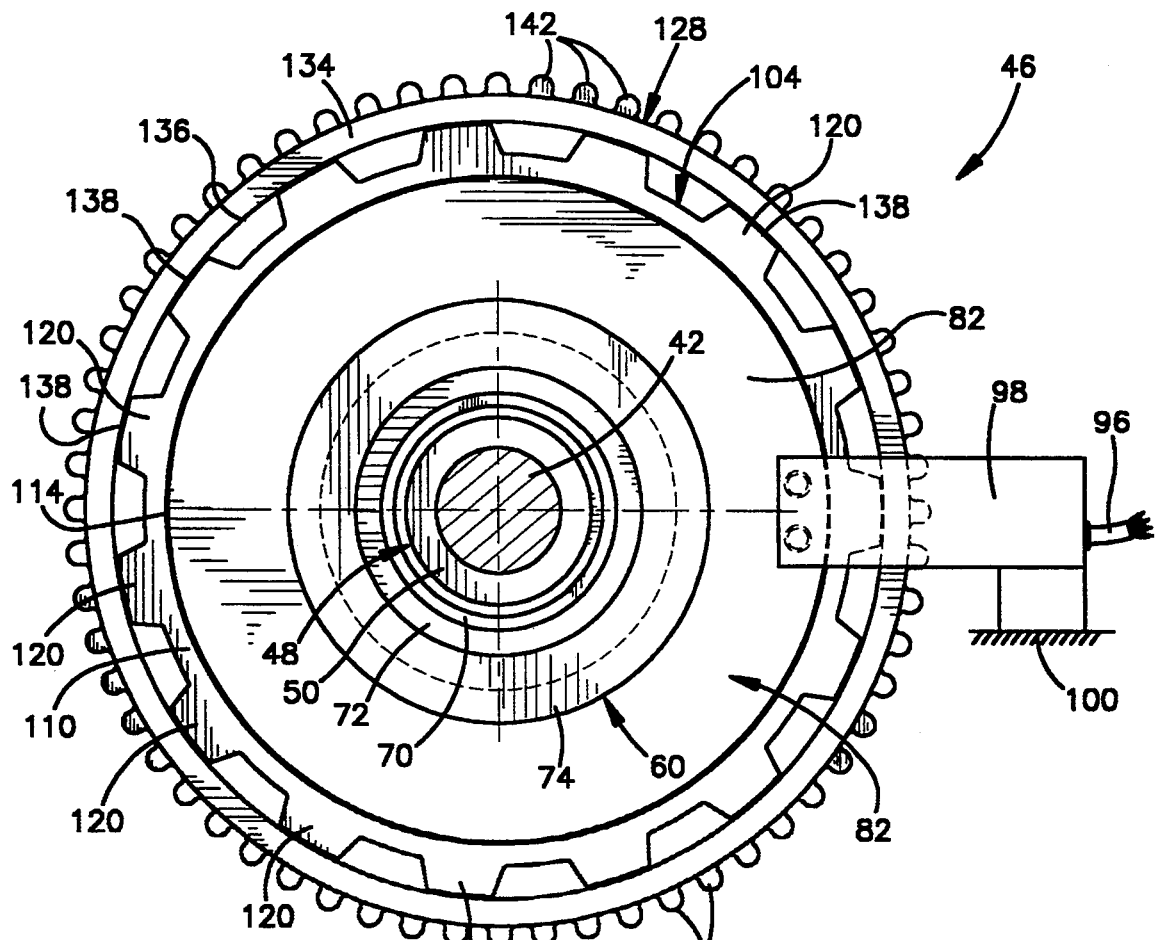
FIG. 3 is an end view, taken generally along the line 3—3 of FIG. 2, further illustrating the construction of the electromagnetic coupling.
Figure 2:
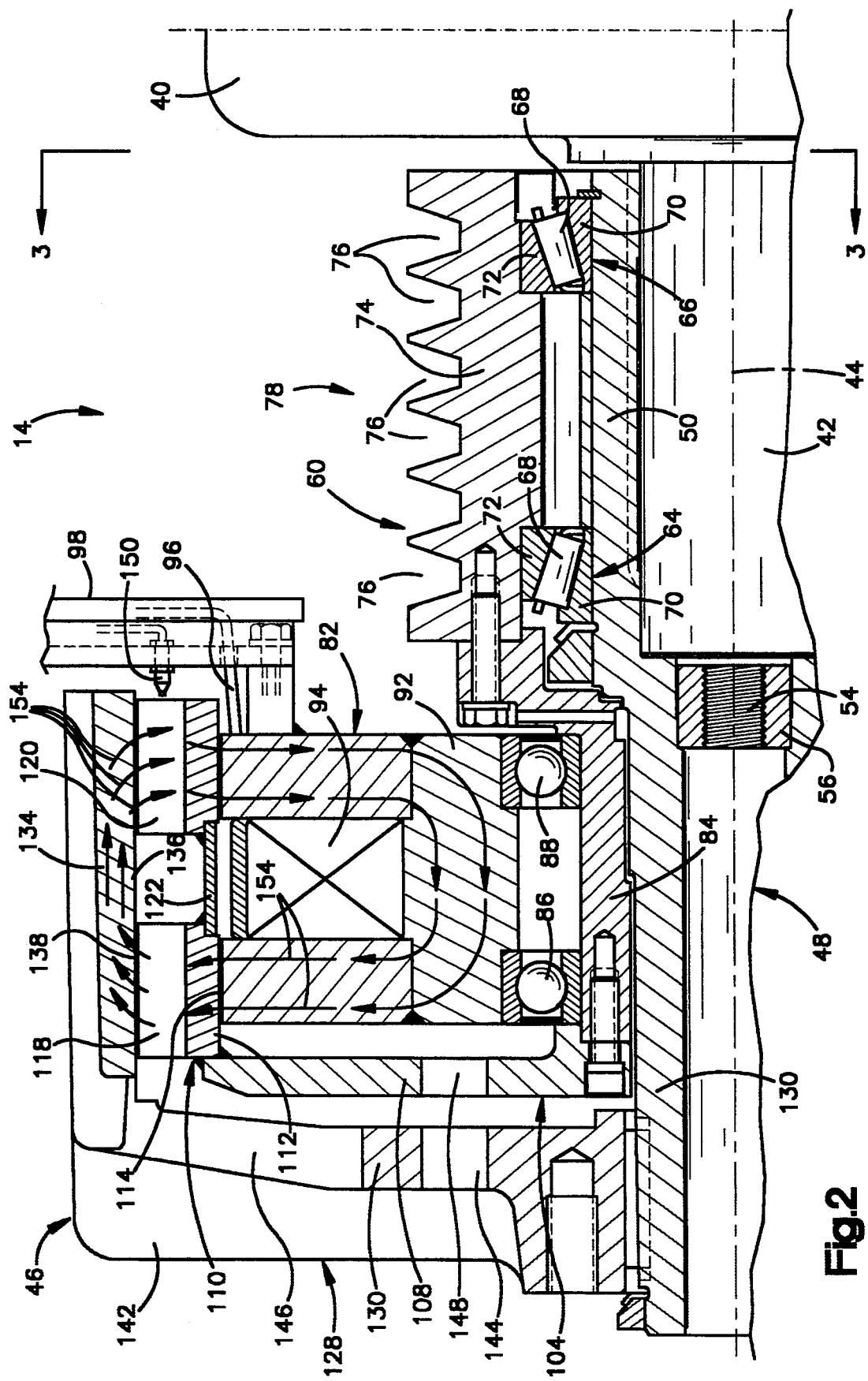
FIG. 2 is a fragmentary sectional view illustrating the construction of an improved electromagnetic coupling which is used in the drive assembly of FIG. 1.

A cylindrical pole piece drum wall 110 is fixedly connected with the radially outer end portion of the annular end wall 108 and circumscribes the stationary annular coil assembly 82. The pole piece drum end wall 108 and cylindrical drywall 110 are disposed in a coaxial relationship with the inner and outer shafts 48 and 60 and the motor output shaft 42. The pole piece drum 110 has a cylindrical inner side surface 112 which is spaced from the stationary annular coil assembly 82 at a circular parasitic air gap 114 (FIGS. 2 and 3). The outer shaft 60 and pole piece drum 104 are rotatable together relative to both the stationary coil assembly 82 and the inner shaft 48.

A plurality of generally rectangular iron pole pieces 118 and 120 extend radially outwardly from the cylindrical drumwall 110 of the pole piece drum 104. The pole pieces 118 and 120 are spaced apart from each other and are disposed in an annular array about the periphery of the cylindrical pole piece drum wall 110 (FIGS. 2 and 3). The pole pieces 118 and 120 are interconnected by a cylindrical separator tube 122 formed of aluminum or other nonmagnetic material. The pole pieces 118 and 120 concentrate the magnetic field from the coil assembly 82.

A cylindrical eddy current drum 128 is formed of iron or other electrically and magnetically conductive material. The cylindrical eddy current drum 128 is coaxial with and circumscribes both the pole piece drum 104 and the stationary coil assembly 82. The cylindrical eddy current drum 128 is fixedly connected with a cylindrical outer end portion 130 (FIG. 2) of the inner shaft 48 for rotation therewith relative to the pole piece drum 104 and stationary coil assembly 82.

The generally cylindrical eddy current drum 128 includes an annular end wall 130 (FIG. 2). The end wall 130 extends generally parallel to and is axially spaced from the end wall 108 of the pole piece drum 104. The eddy current drum 128 has a cylindrical eddy current drum wall 134 which is fixedly connected with a radially outer end portion of end wall 130 of the eddy current drum.

The cylindrical eddy current drum wall 134 (FIGS. 2 and 3) is coaxial with the cylindrical pole piece drum wall 110 and the stationary coil assembly 82. The eddy current drum wall 134 has a cylindrical inner side surface 136 which extends around and is coaxial with the drum wall 110 of the pole piece drum 104. The cylindrical inner side surface 136 of the eddy current drywall 134 is spaced from the pole pieces 118 and 120 by a relatively small active air gap 138. Since the eddy current drum 128 is spaced from the pole pieces 118 and 120, the eddy current drum 128 can rotate with the inner shaft 48 relative to the pole piece drum 104 and outer shaft 60 during operation of the electromagnetic coupling 46.

A plurality of cooling fins 142 (FIG. 2) extend radially and axially along the outside of the eddy current drum 128. The fins 142 induce a flow of cooling air through openings 144 and 146 formed in the eddy current drum end wall 130 and through openings 148 formed in the pole piece drum end wall 108. The flow of air induced by the fins 142 is effective to transfer heat from the eddy current drum 128, pole piece drum 104, and stationary annular coil assembly 82 during operation of the electromagnetic coupling 48.

A sensor 150 on the anchor 98 detects movement of the pole pieces 120. The sensor 150 provides an output pulse each time a pole piece 120 moves past the sensor. The output from the sensor 150 is transmitted to suitable controls which regulate the flow of electrical energy to the coil assembly 82.

In the embodiment of the invention illustrated in FIG. 2, the motor 40 drives the inner shaft 48 so that the electromagnetic coupling 46 is effective to transmit force to the driven outer shaft 60. However, it is contemplated that the outer shaft 60 could be the drive shaft and the inner shaft 48 could be driven by force transmitted through the electromagnetic coupling assembly 46. If this was done, the drive belts would be utilized to transmit drive force to the sheave 78 and outer shaft 60. This drive force would be transmitted through the electromagnetic coupling 46 to the inner shaft 48.

When force is to be transmitted through the electromagnetic coupling 46 from the outer shaft 60 to the inner shaft 48, the inner shaft 48 is connected with an assembly which is to be driven, such as the gear reduction unit 30 (FIG. 1). However, it is preferred to drive the inner shaft 48 with the motor output shaft 42. Driving the inner shaft 48 maximizes the speed at which the eddy current drum 128 is rotated to promote a flow of cooling air through and around the electromagnetic coupling 46.

It is also contemplated that the orientation of the eddy current drum 128 and pole piece drum 104 could be changed so that they open toward the left (as viewed in FIG. 2). The stationary coil assembly 82 would then be located to the left of the end walls 108 and 130 of the pole piece drum 104 and eddy current drum 128. If this was done, the pole piece drum 104 would be connected with the inner shaft 48 and the eddy current drum 128 would be connected with the outer shaft 60. With this arrangement, force could be transmitted from either the inner shaft 48 through the electromagnetic coupling 46 to the outer shaft 60 or from the outer shaft 60 through the electromagnetic coupling to the inner shaft. Since the outer shaft 60 would be connected with the eddy current drum 128 in this arrangement, it is contemplated that it may be preferred to drive the outer shaft 60 in order to obtain a constant flow of cooling air through the electromagnetic coupling 46.

During operation of the embodiment of the drive assembly 14 illustrated in FIGS. 2 and 3, the electric motor 40 drives the inner shaft 48. This rotates the eddy current drum 128 relative to the stationary coil assembly 82. The stationary annular coil assembly 82 is energized, by electrical energy transmitted through the conductor 96. Magnetic flux, indicated schematically by arrows 154 in FIG. 2, is conducted in a circuitous path from the coil assembly 82 through the parasitic air gap 114 to the pole piece cylinder drum wall 110.

The pole pieces 118 and 120 concentrate the magnetic flux field from the coil assembly 82. The concentrated magnetic flux is conducted from the pole pieces 118 to the eddy current drum wall 134 through the active air gap 138. The magnetic flux then flows axially along the eddy current drum wall 134 through the active air gap 138 to the pole pieces 120 on the pole piece drum wall 110. The magnetic flux then flows through the parasitic air gap 114 back to the stationary coil assembly 82.

Due to relative rotation between the pole piece drum 104 and eddy current drum 128, eddy currents are induced in the eddy current drum. The magnetic field induced by these eddy currents couples the pole piece drum 104 and eddy current drum 128 to operatively connect the inner and outer shafts 48 and 60 in the same manner as disclosed in U.S. Pat. No. 3,742,270. Rotation of the eddy current drum 128 by the driven inner shaft 48 drives the pole piece drum 104 and outer shaft 60 to rotate the sheave 78 formed on the outer shaft.

If desired, the eddy current drum 128 could be connected to the outer shaft 60 and the pole piece drum 104 could be connected to the inner shaft 48. The orientation of the pole piece drum 104 and eddy current drum 128 could be changed so that they face toward the left (as viewed in FIG. 2), rather than toward the right in the manner shown in FIG. 2. If this was done, the inner and outer shafts 48 and 60 would not extend through the stationary coil assembly 82. The stationary coil assembly 82 would be disposed to the left (as viewed in FIG. 2) of the end walls 108 and 130 of the pole piece drum 104 and eddy current drum 128.

In view of the foregoing description, it is apparent that the present invention relates to an electromagnetic coupling 46 having a rotatable outer shaft 60 which is disposed in a coaxial relationship with and circumscribes a rotatable inner shaft 48. A stationary coil assembly 82 is disposed in a coaxial relationship with the inner and outer shafts 48 and 60. A rotatable pole piece drum 104 is disposed in a coaxial relationship with and circumscribes the stationary coil assembly 82. A rotatable eddy current drum 128 is disposed in a coaxial relationship with and circumscribes both the pole piece drum 104 and the stationary coil assembly 82. The pole piece and eddy current drums 104 and 128 are connected with the inner and outer shafts 48 and 60. The inner and outer shafts 48 and 60 extend in the same axial direction, toward the right as viewed in FIG. 2, from the pole piece and eddy current drums 104 and 128.

In the specific embodiment of the invention illustrated in FIGS. 2 and 3, the inner shaft 48 is connected with the eddy current drum 128 and is driven by the output shaft 42 of a motor 40. The pole piece drum 104 is connected with the outer shaft 60 and drives an apparatus, such as an oil well pump assembly 12, connected with the electromagnetic coupling 46. However, it is contemplated that the eddy current drum 128 could be connected with the inner shaft 48 and the pole piece drum could be connected with the outer shaft 60. If desired, the eddy current drum 128 and pole piece drum 104 may oriented so as to open either toward end portions of the inner and outer shafts 48 and 60 (as shogun in FIG. 2) or away from the end portions of the inner and outer shafts. It should also be understood that either the inner or outer shaft 48 or 60 may be the driven shaft.

Having described the invention, the following is claimed:

1. An electromagnetic coupling comprising a rotatable inner shaft, a rotatable outer shaft disposed in a coaxial relationship with said inner shaft and circumscribing said inner shaft, a stationary circular coil disposed in a coaxial relationship with said inner and outer shafts, a rotatable pole piece drum disposed in a coaxial relationship with and circumscribing said stationary circular coil, said pole piece drum including a generally cylindrical drum wall extending around said stationary circular coil and having means to concentrate magnetic flux conducted from said stationary circular coil, a rotatable eddy current drum disposed in a coaxial relationship with and circumscribing said pole piece drum and said stationary circular coil, said eddy current drum including a generally cylindrical drum wall which circumscribes said generally cylindrical pole piece drum wall and is effective to conduct magnetic flux, said pole piece drum being connected with one of said inner and outer shafts for rotation therewith relative to said stationary circular coil, said eddy current drum being connected with the other of said inner and outer shafts for rotation therewith relative to said stationary circular coil, said inner and outer shafts extending in the same axial direction from said pole piece drum and said eddy current dry, and bearing means disposed between said inner and outer shafts for at least partially supporting said inner and outer shafts for rotation relative to each other, said bearing means having an annular configuration and extending around said inner shaft, said bearing means being circumscribed by said outer shaft.

2. An electromagnetic coupling as set forth in claim 1 wherein said pole piece drum includes a circular end wall which extends radially inwardly from said cylindrical drum wall of said pole piece drum, said eddy current drum including a circular end wall which extends radially inwardly from said cylindrical drum wall of said eddy current drum, said inner shaft having an end portion which is fixedly connected with the circular end wall of a first one of said pole piece and eddy current drums, said outer shaft having an end portion which is fixedly connected with the circular end wall of a second one of said pole piece and eddy current drums, said inner and outer shafts extending in the same axial direction from said circular end walls of said pole piece and eddy current drums.

3. An electromagnetic coupling as set forth in claim 1 wherein one of said inner and outer shafts is a drive shaft, said eddy current drum being fixedly connected with said drive shaft for rotation therewith.

4. An electromagnetic coupling as set forth in claim 1 wherein said stationary circular coil has an annular configuration, said inner and outer shafts extending axially through said stationary circular coil.

5. An electromagnetic coupling as set forth in claim 1 wherein said generally cylindrical drum wall of said pole piece drum and said generally cylindrical drum wall of said eddy current drum are disposed in a coaxial relationship with and circumscribe said stationary circular coil and said inner and outer shafts.

6. An electromagnetic coupling as set forth in claim 1 wherein said outer shaft includes surface means for defining a plurality of annular grooves which are disposed in an outer side portion of said outer shaft and are engageable with belt means to transmit force between said belt means and said outer shaft.

7. An electromagnetic coupling as set forth in claim 6 wherein said plurality of annular grooves are coaxial with and circumscribe a portion of said inner shaft.

8. An electromagnetic coupling as set forth in claim 1 further including anchor means connected with said stationary circular coil and extending radially outwardly of said stationary circular coil past said generally cylindrical drum wall of said pole piece drum and past said generally cylindrical drum wall of said eddy current drum, said anchor means being effective to hold said stationary circular coil against rotation during rotation of said pole piece and eddy current drums.

9. An electromagnetic coupling as set forth in claim 1 wherein said inner shaft includes surface means defining an opening for receiving a force transmitting shaft, and an internal thread convolution fixedly connected with said surface means for receiving an externally threaded member having an end portion engageable with the force transmitting shaft to move said inner shaft axially relative to the force transmitting shaft.

10. An electromagnetic coupling comprising a rotatable inner shaft, a rotatable outer shaft disposed in a coaxial relationship with said inner shaft and circumscribing said inner shaft, said outer shaft having surface means for defining a plurality of annular grooves which are disposed in an outer side portion of said outer shaft and are engageable with belt means to transmit force between said belt means and said outer shaft, a stationary circular coil disposed in a coaxial relationship with said inner and outer shafts, a rotatable pole piece drum disposed in a coaxial relationship with and circumscribing said stationary circular coil, said pole piece drum including a generally cylindrical drum wall extending around said stationary circular coil and having means to concentrate magnetic flux conducted from said stationary circular coil, a rotatable eddy current drum disposed in a coaxial relationship with and circumscribing said pole piece drum and said stationary circular coil, said eddy current drum including a generally cylindrical drum wall which circumscribes said generally cylindrical pole piece drum wall and is effective to conduct magnetic flux, said pole piece drum being connected with one of said inner and outer shafts for rotation therewith relative to said stationary circular coil, said eddy current drum being connected with the other of said inner and outer shafts for rotation therewith relative to said stationary circular coil, said inner and outer shafts extending in the same axial direction from said pole piece drum and said eddy current drum.

11. An electromagnetic coupling as set forth in claim 10 wherein said plurality of annular grooves are coaxial with and circumscribe a portion of said inner shaft.

12. An electromagnetic coupling comprising a rotatable inner shaft, a rotatable outer shaft disposed in a coaxial relationship with said inner shaft and circumscribing said inner shaft, a stationary circular coil disposed in a coaxial relationship with said inner and outer shafts, a rotatable pole piece drum disposed in a coaxial relationship with and circumscribing said stationary circular coil, said pole piece drum including a generally cylindrical drum wall extending around said stationary circular coil and having means to concentrate magnetic flux conducted from said stationary circular coil, a rotatable eddy current drum disposed in a coaxial relationship with and circumscribing said pole piece drum and said stationary circular coil, said eddy current drum including a generally cylindrical drum wall which circumscribes said generally cylindrical pole piece drum wall and is effective to conduct magnetic flux, said pole piece drum being connected with one of said inner and outer shafts for rotation therewith relative to said stationary circular coil, said eddy current drum being connected with the other of said inner and outer shafts for rotation therewith relative to said stationary circular coil, said inner and outer shafts extending in the same axial direction from said pole piece drum and said eddy current drum, and anchor means connected with said stationary circular coil and extending radially outwardly of said stationary circular coil past said generally cylindrical drum wall of said pole piece drum and past said generally cylindrical drywall of said eddy current drum, said anchor means being effective to hold said stationary circular coil against rotation during rotation of said pole piece and eddy current drums.

13. An electromagnetic coupling as set forth in claim 12 further including bearing means disposed between said inner and outer shafts for at least partially supporting said inner and outer shafts for rotation relative to each other.

14. An electromagnetic coupling as set forth in claim 12 wherein said pole piece drum includes a circular end wall which extends radially inwardly from said cylindrical drum wall of said pole piece drum, said eddy current drum including a circular end wall which extends radially inwardly from said cylindrical drum wall of said eddy current drum, said inner shaft having an end portion which is fixedly connected with the circular end wall of a first one of said pole piece and eddy current drums, said outer shaft having an end portion which is fixedly connected with the circular end wall of a second one of said pole piece and eddy current drums, said inner and outer shafts extending in the same axial direction from said circular end walls of said pole piece and eddy current drums.

15. An electromagnetic coupling as set forth in claim 12 wherein one of said inner and outer shafts is a drive shaft, said eddy current drum being fixedly connected with said drive shaft for rotation therewith.

16. An electromagnetic coupling as set forth in claim 12 wherein said stationary circular coil has an annular configuration, said inner and outer shafts extending axially through said stationary circular coil.

17. An electromagnetic coupling as set forth in claim 12 wherein said generally cylindrical drywall of said pole piece drum and said generally cylindrical drum wall of said eddy current drum are disposed in a coaxial relationship with and circumscribe said stationary circular coil and said inner and outer shafts.

18. An electromagnetic coupling as set forth in claim 12 wherein said outer shaft includes surface means for defining a plurality of annular grooves which are disposed in an outer side portion of said outer shaft and are engageable with belt means to transmit force between said belt means and said outer shaft.

19. An electromagnetic coupling as set forth in claim 18 wherein said plurality of annular grooves are coaxial with and circumscribe a portion of said inner shaft.

20. electromagnetic coupling as set forth in claim 12 wherein said inner shaft includes surface means defining an opening for receiving a force transmitting shaft, and an internal thread convolution fixedly connected with said surface means for receiving an externally threaded member having an end portion engageable with the force transmitting shaft to move said inner shaft axially relative to the force transmitting shaft.

21. An electromagnetic coupling comprising a rotatable inner shaft, a rotatable outer shaft disposed in a coaxial relationship with said inner shaft and circumscribing said inner shaft, a stationary circular coil disposed in a coaxial relationship with said inner and outer shafts, a rotatable pole piece drum disposed in a coaxial relationship with and circumscribing said stationary circular coil, said pole piece drum including a generally cylindrical drum wall extending around said stationary circular coil and having means to concentrate magnetic flux conducted from said stationary circular coil, a rotatable eddy current drum disposed in a coaxial relationship with and circumscribing said pole piece drum and said stationary circular coil, said eddy current drum including a generally cylindrical drum wall which circumscribes said generally cylindrical pole piece drum wall and is effective to conduct magnetic flux, said pole piece drum being connected with one of said inner and outer shafts for rotation therewith relative to said stationary circular coil, said eddy current drum being connected with the other of said inner and outer shafts for rotation therewith relative to said stationary circular coil, said inner and outer shafts extending in the see axial direction from said pole piece drum and said eddy current drum, said inner shaft includes surface means defining an opening for receiving a force transmitting shaft, and an internal thread convolution fixedly connected with said surface means for receiving an externally threaded member having an end portion engageable with the force transmitting shaft to move said inner shaft axially relative to the force transmitting shaft.

22. An apparatus comprising a motor having a rotatable output shaft, an inner shaft fixedly connected with said motor output shaft for rotation therewith, an outer shaft disposed in a coaxial relationship with said inner shaft and circumscribing said inner shaft, a stationary annular coil circumscribing said inner and outer shafts, bearing means disposed between said stationary annular coil and said outer shaft to at least partially support said stationary annular coil on said outer shaft and to enable said outer shaft to rotate relative to said stationary annular coil, a rotatable pole piece drum disposed in a coaxial relationship with and circumcribing said stationary annular coil, said pole piece drum including a circular end wall fixedly connected to an end portion of said outer shaft and a generally cylindrical drum wall connected with a radially outer portion of said circular end wall and circumscribing said stationary annular coil, said pole piece drum being rotatable with said outer shaft relative to said stationary coil, a rotatable eddy current drum disposed in a coaxial relationship with and circumscribing said pole piece drum and said stationary annular coil, said eddy current drum including a circular end wall fixedly connected to an end portion of said inner shaft and extending radially outwardly from said inner shaft and a generally cylindrical drum wall connected with a radially outer portion of said end wall of said eddy current drum, said cylindrical drum wall of said eddy current drum circumscribing said stationary annular coil and said drum wall of said pole piece drum, said eddy current drum being rotatable with said inner shaft relative to said stationary coil and to said pole piece drum, anchor means connected with said stationary annular coil for holding said stationary annular coil against rotation, and force transmitting surface means connected with a portion of said outer shaft disposed between said motor and said bearing means for transmitting force to drive a driven member.

23. An apparatus as set forth in claim 22 further including internal thread means disposed in a coaxial relationship with said inner and outer shafts for engaging an externally threaded member to enable the externally threaded member to apply force against said motor output shaft to move said inner and outer shafts axially relative to said motor output shaft.

24. An apparatus as set forth in claim 22 further including second bearing means disposed between said inner and outer shafts to at least partially support said outer shaft on said inner shaft and to enable said inner shaft to rotate relative to said outer shaft.

25. An apparatus comprising oil well pump means for pumping oil, said oil well pump means including a pump rod and means for reciprocating said pump rod, said means for reciprocating said pump rod including a beam assembly which is connected with the pump rod, a crank assembly which is connected with the beam assembly, and a drive assembly which is operable to drive the crank assembly, said drive assembly comprising a motor, a rotatable inner shaft connected with said motor to enable said motor to rotate said inner shaft, an outer shaft disposed in a coaxial relationship with and circumscribing said inner shaft, bearing means disposed between said inner and outer shafts to at least partially support said outer shaft on said inner shaft and to enable said inner shaft to rotate relative to said outer shaft, a stationary circular coil disposed in a coaxial relationship with said inner and outer shafts, a rotatable pole piece drum disposed in a coaxial relationship with and circumscribing said stationary circular coil, said pole piece drum including a circular end wall disposed adjacent to one axial end portion of said stationary circular coil and a generally cylindrical drum wall extending around said stationary circular coil and having means to concentrate magnetic flux conducted from said stationary circular coil, said drum wall being fixedly connected with said circular end wall for rotation therewith relative to said stationary circular coil, said circular end wall being fixedly connected with one of said inner and outer shafts for rotation therewith, a rotatable eddy current drum disposed in a coaxial relationship with and circumscribing both said stationary circular coil and said pole piece drum, said eddy current drum including a circular end wall disposed adjacent to said circular end wall of said pole piece drum and a generally cylindrical drum wall extending around said pole piece drum wall, said drum wall of said eddy current drum being fixedly connected with said circular end wall of said eddy current drum for rotation therewith relative to both said stationary circular coil and said pole piece drum, said circular end wall of said eddy current drum being fixedly connected with one of said inner and outer shafts for rotation therewith, said inner and outer shafts extending in the same axial direction from said pole piece drum and said eddy current drum, and force transmitting means connected with said outer shaft for transmitting force from said outer shaft to said crank assembly upon rotation of said outer shaft.

26. An apparatus as set forth in claim 25 wherein said means to concentrate magnetic flux includes a plurality of pole pieces extending radially outwardly from said drum wall of said pole piece dry.

27. An apparatus as set forth in claim 25 further including anchor means connected with said stationary circular coil and extending outwardly from said stationary circular coil to hold said stationary circular coil against rotation during rotation of said pole piece and eddy current drums.

28. An apparatus as set forth in claim 25 wherein said stationary circular coil has a central opening through which said inner and outer shafts extend, said apparatus further including second bearing means disposed between said stationary circular coil and said outer shaft to at least partially support said stationary circular coil on said outer shaft and to enable said outer shaft to rotate relative to said stationary circular coil.

29. An apparatus as set forth in claim 25 wherein said circular end wall of said pole piece drum is fixedly connected with an end portion of said outer shaft and said end wall of said eddy current drum is fixedly connected with an end portion of said inner shaft.

30. An apparatus as set forth in claim 25 wherein said force transmitting means connected with said outer shaft includes a plurality of belts which engage annular grooves foraged in said end portion of said outer shaft.

* * * * *

UNITED STATES PATENT AND TRADEMARK OFFICE
CERTIFICATE OF CORRECTION

PATENT NO. : 5,363,912
DATED : November 15, 1994
INVENTOR(S) : John H. Wolcott

It is certified that error appears in the above-indentified patent and that said Letters Patent is hereby corrected as shown below:

Column 6, line 63, change "dry" to --drum--.

Column 8, line 48, change "drywall" to --drum wall--.

Column 9, line 57, change "see" to --same--.

Column 12, line 2, change "dry" to --drum--.

Column 12, line 26, change "foraged" to --formed--.

Signed and Sealed this

Eleventh Day of April, 1995

Attest:

BRUCE LEHMAN

Attesting Officer      Commissioner of Patents and Trademarks